US010941991B2

(12) United States Patent
Zager et al.

(10) Patent No.: US 10,941,991 B2
(45) Date of Patent: Mar. 9, 2021

(54) INTEGRAL DRAIN ASSEMBLY FOR A HEAT EXCHANGER AND METHOD OF FORMING

(71) Applicant: Hamilton Sundstrand Corporation, Charlotte, NC (US)

(72) Inventors: Michael Zager, Windsor, CT (US); Michael Doe, Southwick, MA (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 148 days.

(21) Appl. No.: 16/108,871

(22) Filed: Aug. 22, 2018

(65) Prior Publication Data
US 2019/0003788 A1    Jan. 3, 2019

Related U.S. Application Data

(62) Division of application No. 15/251,885, filed on Aug. 30, 2016, now Pat. No. 10,168,114.

(51) Int. Cl.
*F28F 17/00* (2006.01)
*F24H 9/16* (2006.01)
(Continued)

(52) U.S. Cl.
CPC ........ *F28F 17/005* (2013.01); *F02B 29/0468* (2013.01); *F24H 9/16* (2013.01); *F28D 1/047* (2013.01); *F02B 29/045* (2013.01); *F28F 2265/06* (2013.01); *F28F 2265/22* (2013.01); *Y02T 10/12* (2013.01)

(58) Field of Classification Search
CPC .. F28F 17/005; F28F 2265/22; F28F 2265/06; F28F 1/12; F24H 9/16; F28D 1/047; F02B 29/0468; F02B 29/045; F16T 1/20
See application file for complete search history.

(56) References Cited

U.S. PATENT DOCUMENTS

| 4,350,025 A | 9/1982 | Izumi |
| 5,481,886 A | 1/1996 | Hasegawa et al. |

(Continued)

FOREIGN PATENT DOCUMENTS

| JP | H08232652 A | 9/1996 |
| JP | 2001355994 A | 12/2001 |

(Continued)

OTHER PUBLICATIONS

EP Search Report regarding related EP App. No. 17185892.1; dated Feb. 6, 2018; 7 pgs.
(Continued)

*Primary Examiner* — Lee A Holly
(74) *Attorney, Agent, or Firm* — Cantor Colburn LLP

(57) ABSTRACT

A method of forming an integral drain for a heat exchanger is provided. The method includes forming a plurality of passage walls to define a plurality of passages with an additive manufacturing process, each of the passage walls having a non-linear portion. The method also includes integrally forming a drain wall with at least one of the passage walls with the additive manufacturing process to define a drain for each of the plurality of passages, the drain wall located proximate the non-linear portion of each of the plurality of passage walls.

2 Claims, 1 Drawing Sheet

(51) Int. Cl.
    *F02B 29/04*     (2006.01)
    *F28D 1/047*     (2006.01)

(56) References Cited

U.S. PATENT DOCUMENTS

| | | |
|---|---|---|
| 5,775,402 A | 7/1998 | Sachs et al. |
| 5,829,513 A | 11/1998 | Urch |
| 8,707,722 B2 | 4/2014 | Kim |
| 9,073,150 B2 | 7/2015 | Graichen |
| 9,174,387 B2 | 11/2015 | Luzenski et al. |
| 2002/0134087 A1 | 9/2002 | Urch |
| 2007/0169500 A1 | 7/2007 | Rios et al. |
| 2013/0306280 A1* | 11/2013 | Goodman ............... F28F 1/12 165/109.1 |
| 2014/0150656 A1 | 6/2014 | Vandermeulen |
| 2014/0158328 A1 | 6/2014 | Persson et al. |
| 2015/0096718 A1 | 4/2015 | Noel-Baron |
| 2016/0161195 A1 | 6/2016 | Meng |
| 2016/0195336 A1 | 7/2016 | Veilleux, Jr. |
| 2018/0058779 A1 | 3/2018 | Zager |

FOREIGN PATENT DOCUMENTS

| | | | |
|---|---|---|---|
| WO | 2015004591 A1 | 1/2015 | |
| WO | WO-2018034636 A1 * | 2/2018 | ............... F16T 1/20 |

OTHER PUBLICATIONS

JP Office Action; Application No. JP 2017-161709; dated Jan. 5, 2021; 9 pages.

\* cited by examiner

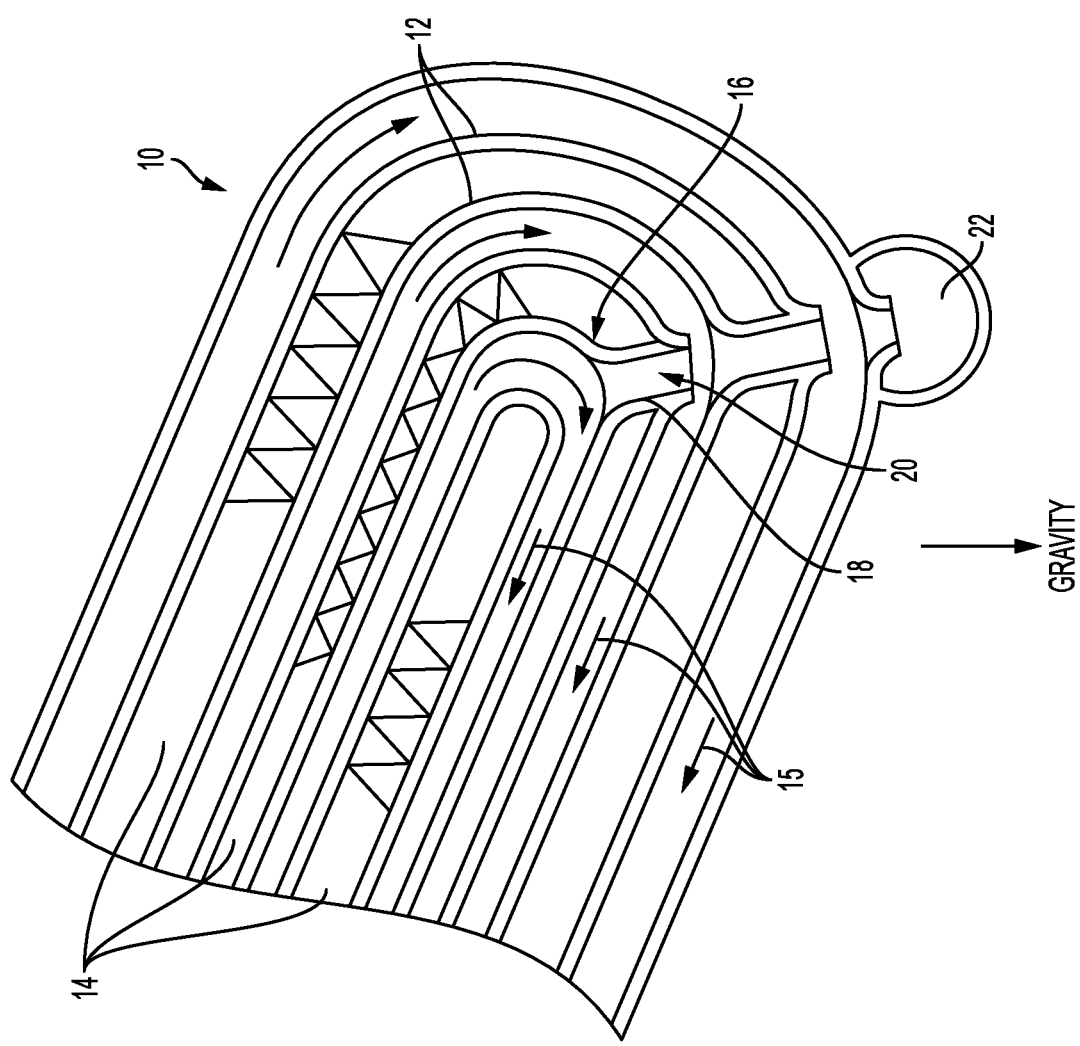

INTEGRAL DRAIN ASSEMBLY FOR A HEAT EXCHANGER AND METHOD OF FORMING

CROSS-REFERENCE TO RELATED APPLICATION

This is a divisional application of U.S. patent application Ser. No. 15/251,885, filed on Aug. 30, 2016, the disclosure of which is incorporated herein by reference in its entirety.

BACKGROUND

The embodiments herein relate to heat exchangers and, more particularly, to an integral drain assembly for heat exchangers, as well as a method of forming such heat exchangers.

Heat exchangers often condense water when humid air is cooled. The orientation of each heat exchanger is typically governed by installation constraints and is not always ideal for promoting drainage of the condensed water. Incomplete drainage can lead to corrosion and freezing damage, thus limiting heat exchanger life and/or failure of the heat exchanger to perform its intended function.

BRIEF DESCRIPTION

According to one embodiment, an integral drain assembly for a heat exchanger includes a plurality of passage walls defining a plurality of passages, each of the passage walls having a non-linear portion. Also included is a drain wall integrally formed with at least one of the passage walls to define a drain for each of the plurality of passages, the drain wall located proximate the non-linear portion of each of the plurality of passage walls.

According to another embodiment, a method of forming an integral drain for a heat exchanger is provided. The method includes forming a plurality of passage walls to define a plurality of passages with an additive manufacturing process, each of the passage walls having a non-linear portion. The method also includes integrally forming a drain wall with at least one of the passage walls with the additive manufacturing process to define a drain for each of the plurality of passages, the drain wall located proximate the non-linear portion of each of the plurality of passage walls.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

FIG. 1 is a cross-sectional view of a heat exchanger having an integral drain assembly.

DETAILED DESCRIPTION

Referring to FIG. 1, a cross-section of a heat exchanger is illustrated and generally referenced with numeral 10. The illustrated heat exchanger is a cross-flow heat exchanger, but it is to be appreciated that a counter-flow heat exchanger may be employed. Furthermore, it is contemplated that any application where access for drains is difficult or impossible to implement may benefit from the embodiments disclosed herein.

The heat exchanger 10 includes a plurality of passage walls 12 that define at least one, but typically a plurality of passages 14, as shown. The passages 14 are configured to route a fluid 15 therealong for heat transfer purposes. Condensation of the fluid (such as humid air) occurs within the passages 14, thereby leaving condensed liquid within the passages 14.

The plurality of passage walls 12, and therefore passages 14, may extend along any desired or advantageous path. Regardless of the path of the passages 14, a non-linear portion 16 of the path is provided. Although there may be multiple non-linear portions along the path of the passages 14, at least part of the non-linear portion 16 shown is located at a lowest point of the passage 14 when the heat exchanger 10 is in an installed position. More specifically, the lowest point of the passage 14 is positioned where gravity will ultimately draw any condensed liquid located within the passage 14.

At least one drain wall 18 is located proximate the non-linear portion 16 of each passage 14 at the lowest point of the passage. The drain wall 18 defines a drain 20 that is sized to receive condensed liquid for routing out of the passage 14. By placing the drain 20 at the lowest point of the passage (when the heat exchanger 10 is in an installed position), all of the condensed liquid in the passage 14 flows to the drain 20 due to gravitational effect, whether the liquid is upstream or downstream of the drain 20. The drain 20 is small enough to not cause a pressure differential in the passage 14 that alters desired operation of the heat exchanger 10.

As shown, a plurality of drains 20 are employed in some embodiments to fluidly couple the passages 14 and ultimately fluidly couple each drain 20 and passage 14 to a common drain 22. The common drain 22 may be a manifold or the like that routes the liquid to a desired remote location.

The heat exchanger 10 and particularly the drain(s) 20 are formed from an additive manufacturing process that allows the drain(s) 20 to be integrally formed with the heat exchanger 10 and the respective passages 14. Similarly, the common drain 22 may be integrally formed with the heat exchanger 10 by an additive manufacturing process to collect liquid from multiple drain locations, if needed. The additive manufacturing process employed to form the heat exchanger 10 includes direct metal laser sintering (DMLS). A non-metallic heat exchanger is also contemplated for some applications. In such embodiments, selective laser sintering (SLS) may be employed as the additive manufacturing process. Both processes are a form of powder bed fusion.

By integrally forming the drain(s) 20 and common drain 22 with the heat exchanger by an additive manufacturing process, the drain is able to be placed in areas that were previously difficult or impossible to access. Installations previously considered unacceptable may now be considered, thus providing additional proposed solutions for customers. Therefore, the drain is better placed and less costly to implement. Additionally, by ensuring that all condensed liquid is removed from the passages 14, the reliability and life of a condensing heat exchanger is increased due to reduced corrosion and prevention of freezing damage. The enhanced reliability and the reduction in replacement needs increases customer satisfaction.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of forming a heat exchanger with an integral drain, the method comprising:

forming, with an additive manufacturing process, a plurality of passage walls to define a plurality of passages configured to route a fluid therealong for heat transfer purposes, each of the passage walls having a non-linear portion;

integrally forming a plurality of drain walls with a respective one or more of the passage walls with the additive manufacturing process to define a plurality of drains for the plurality of passages, the plurality of drain walls located proximate the non-linear portion of the respective plurality of passage walls;

integrally forming a common drain with the heat exchanger to fluidly couple the plurality of drains; and forming the plurality of drains at the non-linear portion of the respective plurality of walls so that the plurality of drains are positioned at a lowest point of the respective plurality of passages in an installed position of the heat exchanger.

2. The method of claim 1, further comprising fluidly coupling the common drain to a remote location for routing of drained fluid.

* * * * *